US005411673A

United States Patent [19]

Agar et al.

[11] Patent Number: 5,411,673

[45] Date of Patent: May 2, 1995

[54] PEROXYACID BLEACH PRECURSOR COMPOSITIONS

[75] Inventors: Joseph T. H. Agar; Douglas G. Fraser, both of Newcastle upon Tyne, Great Britain

[73] Assignee: The Procter & Gamble Company, Cincinnati, Ohio

[21] Appl. No.: 94,090

[22] PCT Filed: Jan. 28, 1992

[86] PCT No.: PCT/US92/00664

§ 371 Date: Jul. 30, 1993

§ 102(e) Date: Jul. 30, 1993

[87] PCT Pub. No.: WO92/13798

PCT Pub. Date: Aug. 20, 1992

[30] Foreign Application Priority Data

Feb. 6, 1991 [GB] United Kingdom ................. 9102507

[51] Int. Cl.[6] ........................ C11D 3/395; C11D 7/54; C01B 15/04; C09K 3/00

[52] U.S. Cl. ................................ 252/95; 252/186.25; 252/186.27; 252/186.31; 252/186.38; 252/99; 252/102

[58] Field of Search ...................... 252/186.25, 186.27, 252/186.38, 95

[56] References Cited

U.S. PATENT DOCUMENTS

| | | | |
|---|---|---|---|
| 4,290,903 | 9/1981 | Macgilp et al. | 252/91 |
| 4,399,049 | 8/1983 | Gray et al. | 252/91 |
| 4,422,950 | 12/1983 | Kemper et al. | 252/186.38 |
| 4,444,674 | 4/1984 | Gray | 252/91 |
| 4,486,327 | 12/1984 | Murphy et al. | 252/94 |
| 4,678,594 | 7/1987 | Parfomak et al. | 252/186.31 |
| 4,726,908 | 2/1988 | Kruse et al. | 252/91 |
| 4,731,195 | 3/1988 | Olson | 252/174.13 |
| 4,853,143 | 8/1989 | Hardy et al. | 252/102 |
| 4,938,889 | 7/1990 | Wilsberg et al. | 252/102 |
| 5,015,408 | 5/1991 | Reuss | 252/99 |
| 5,211,874 | 5/1993 | Haendler et al. | 252/186.26 |
| 5,279,757 | 1/1994 | Gethöffer et al. | 252/95 |

*Primary Examiner*—Robert L. Stoll
*Assistant Examiner*—Joseph D. Anthony
*Attorney, Agent, or Firm*—F. A. Borrego; T. D. Reed; J. C. Rasser

[57] ABSTRACT

Solid Peroxyacid bleach precursor compositions are provided in which the external surfaces of a particulate peroxyacid precursor material is treated with from 2% to 20% by weight of a solid organic acid compound of Mpt>30° C. and an aqueous solubility of at least 20 g/100 g water at 20° C. The bleach precursor material, when so treated, perhydrolyses after 3 minutes in a standard test at 20° C., to at least 90% of the extent of the untreated bleach precursor material under the same conditions. Preferred organic acid compounds are monomeric aliphatic hydroxycarboxylic and polycarboxylic acids such as citric, lactic and glycolic acids. Detergent compositions containing the treated peroxyacid bleach precursor particulates are also disclosed.

18 Claims, No Drawings

PEROXYACID BLEACH PRECURSOR COMPOSITIONS

This application is a 371 of PCT/US92/00664 filed Jan. 28, 1992.

This invention relates to solid peroxy acid bleach precursor compositions and especially to particulate detergent compositions incorporating inorganic perhydrate bleaches together with N- or O-acyl group—containing peroxycarboxylic acid bleach precursors (so-called bleach activators). Such compositions have come into widespread use in recent years as heavy duty fabric cleaning products, particularly in automatic washing machines. The growth in usage of bleach activators has mirrored a decrease in fabric wash temperatures which itself has accompanied an increase in the proportion of fabrics that are colored.

One problem that has become more significant as a result of these trends is that of damage to fabric colors and materials caused by the development of localised high concentrations of bleaching species. High bleach concentrations can arise around any particulate bleaching species for several reasons. The bleaching species may itself have an intrinsically low solubility, its solubility may have been hindered by the presence of other materials such as viscous surfactant phases or the agitation regime in the immediate environment of the bleach species may not be high enough to disperse the dissolved bleach. Where a bleach activator forms a component of the composition the potential problem is increased. In addition to the potential for localised high concentrations of perhydroxyl ion arising from dissolution of the inorganic perhydrate normally contained in laundry detergent compositions, the perhydrolysis of the bleach activator to form peroxycarboxyl anions can give rise to significant localised peroxycarboxylate bleach concentrations.

The development of so-called concentrated products and their delivery via dispensing devices placed in the machine drum together with the fabric load has merely served to exacerbate these problems. Accordingly a need exists to provide detergent compositions in which the bleach activator is incorporated in a form that minimises and preferably eliminates damage to fabric colors and materials during its dissolution and perhydrolysis in the wash liquor.

The prior art contains numerous examples of bleach activators coated or agglomerated so as to increase their stability on storage in detergent compositions and/or to influence their solution behaviour.

EP-A-0070474 discloses granulate bleach activators prepared by spray drying an aqueous pumpable dispersion containing an N-acyl or O-acyl compound together with at least one water soluble cellulose ether, starch or starch derivative in a weight ratio of activator to coating of from 98:2 to 90:10.

GB-A-1507312 discloses the coating of bleach activators with a mixture of alkali metal $C_8$–$C_{22}$ fatty acid salts in admixture with the corresponding fatty acids. GB-A-1381121 employs a molten coating of inter alia $C_{14}$–$C_{18}$ fatty acid mixtures to protect solid bleach activators. GB-A-1441416 discloses a similar process employing a mixture of $C_{12}$–$C_{14}$ fatty acids and $C_{10}$–$C_{20}$ aliphatic alcohols. EP-A-0375241 describes stabilised bleach activator extrudates in which $C_5$–$C_{18}$ alkyl peroxy carboxylic acid precursors are mixed with a binder selected from anionic and nonionic surfactants, film forming polymers fatty acids or mixtures of such binders.

EP-A-0356700 discloses compositions comprising a bleach activator, a water soluble film forming polymer and 2–15 % of a $C_3$–$C_6$ polyvalent carboxylic acid or hydroxycarboxylic acid for enhanced stability and ease of dispersion/solubility. The carboxylic acid, of which a preferred example is citric acid, is dry mixed with the bleach activator and then granulated with the film forming polymer. The citric acid is asserted to provide an enhanced rate of dissolution of the bleach activator granules.

EP-A-0382464 concerns a process for coating or encapsulation of solid particles including bleaching compounds and bleach activators in which a melt is formed of coating material in which the particles form a disperse phase, the melt is destabilised and then caused to crumble to a particulate material in which the disperse phase particles are embedded in the continuous (coating) phase. A variety of coating materials are disclosed and certain materials such as polyacrylic acid and cellulose acetate phthalate are taught as being useful where release of the coated material is dependent on pH.

The overall emphasis in the prior art has thus been on the protection of the bleach activator against a hostile environment during storage and relatively little attention has been paid to the dissolution characteristics of the coated or agglomerated material in use. Where coating and/or agglomeration has been proposed with poorly soluble materials such as fatty acids, this has resulted in a rate of perhydrolysis of the bleach activator which is slower than that which would occur if it had not been so protected. Any use of more rapidly soluble materials such as citric acid has been in the context of an agglomerate component in which more rapid solution of the bleach activator has been the objective. In both instances, because perhydrolysis commences as soon as the detergent product starts to dissolve and form an alkaline hydrogen peroxide solution the problem of localised peroxy acid bleach concentrations has remained unsolved.

One solution to this problem would be to delay the start of perhydrolysis in order to avoid the fabric colour damage problems associated with the dissolution behaviour of other detergent product components. However it is important that perhydrolysis of the bleach precursor and subsequent dispersion of the peroxycarboxylate bleach is as rapid as possible when it commences because of the short wash times of modern automatic washing machines.

The problem that arises in simultaneously satisfying these two objectives does not appear to have been recognised in the prior art.

It is known that the rate of perhydrolysis of a percarboxylic acid bleach precursor in an aqueous oxidising medium is progressively reduced as the pH of the medium is reduced, particularly when the pH falls below the pKa of the parent acid of the precursor leaving group. However the fatty acids taught as coating agents in the prior art are not useful as a means of providing a low pH environment in an aqueous wash liquor because of their insolubility. Moreover fatty acids used as coating and/or agglomerating agents for peroxy acid bleach precursors have been found to reduce the rate of perhydrolysis of the latter, thereby reducing the effectiveness of the resultant peroxycarboxylic acid bleach.

The Applicant has now surprisingly found that acidic materials having certain specified characteristics can be used to provide a surface treatment to particulate peroxy acid bleach precursors, that delays the onset of perhydrolysis during dissolution of the product under the constrained agitation conditions of a loaded washing machine drum without adversely hindering perhydrolysis when it occurs.

According to the present invention there is provided a solid peroxyacid bleach precursor composition comprising a particulate peroxyacid bleach precursor material, said precursor containing one or more N- or O-acyl groups and having a Mpt$>$30° C., the external surfaces of said particulate peroxy acid bleach precursor material being treated with an organic acid compound so as to adhere said compound to said external surfaces, said compound being present in an amount of from 2% to 20% by weight of the treated particulate, said organic acid compound having an aqueous solubility of at least 5 g/100 g of water at 20° C. and a Mpt $>$30° C., wherein said treated particulate bleach precursor material produces, after 3 minutes in a Beaker Perhydrolysis Test at 20° C., at least 90% of the peroxy acid that is produced under the same conditions by said particulate bleach precursor material in untreated form.

Preferably the organic acid compound is a monomeric or oligomeric carboxylate that has an aqueous solubility of at least 20 g/100 g of water at 20° C. Most preferably the compound is a monomeric aliphatic carboxylic acid of very high solubility and Mpt$>$40° C.

It is important for the purposes of the present invention that the external surfaces of the peroxy bleach precursor particulate, whether in the form of individual particles or agglomerates, are treated so that the organic acid compound is adhered thereto. The treatment can be such as to provide the compound in the form of a continuous or discontinuous coating or as masses of the acid compound dispersed on the particulate surface or as individual particles disposed at random on the surface. The requirement is that the surface treatment material be immediately available, on exposure to an aqueous medium, to dissolve rapidly and provide an acid pH environment around the exterior of the bleach precursor particulate. For this reason, incorporation of the organic acid compound as an agglomerating agent dispersed within the peroxyacid bleach precursor particle does not provide the benefit of the invention. This is because, under the conditions of dissolution of a concentrated granular laundry product, particularly when delivered to washing machine drum by a dispensing device, an agglomerated but non surface treated peroxyacid bleach precursor perhydrolyses to a significant extent and generates high bleach concentrations that give rise to localised fabric damage.

The solid peroxyacid bleach precursor compositions of the present invention incorporate precursors containing one or more N- or O-acyl groups, which precursors can be selected from a wide range of classes. Suitable classes include anhydrides, esters, imides and acylated derivatives of imidazoles and oximes, and examples of useful materials within these classes are disclosed in GB-A-1586789. The most preferred classes are esters such as are disclosed in GB-A-836988, 864,798, 1147871 and 2143231 and imides such as are disclosed in GB-A-855735 & 1246338.

Specific O-acylated precursor compounds include 2,3,3-tri-methyl hexanoyl oxybenzene sulfonates, benzyl oxybenzene sulfonates and penta acetyl glucose.

Particularly preferred precursor compounds are the N-,N,N$^1$N$^1$ tetra acetylated compounds of formula

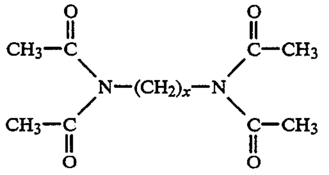

wherein x can be O or an integer between 1 & 6.

Examples include tetra acetyl methylene diamine (TAMD) in which x=1, tetra acetyl ethylene diamine (TAED) in which x=2 and tetraacetyl hexylene diamine (TAHD) in which x=6. These and analogous compounds are described in GB-A-907356. The most preferred peroxyacid bleach precursor is TAED.

Solid peroxyacid bleach precursors useful in the present invention have a Mpt $>$30° C. and preferably $>$40° C. Such precursors will normally be in fine powder or crystalline form in which at least 90% by weight of the powder has a particle size $>$150 micrometers.

This powder can be surface treated directly but is more usually agglomerated, prior to surface treatment, to form particulate material, at least 85% of which has a particle size between 400 and 1700 micrometers. Suitable agglomerating agents include $C_{12}$–$C_{18}$ fatty acids, $C_{12}$–$C_{18}$ aliphatic alcohols condensed with from 10 to 80 moles of ethylene oxide per mole of alcohol, cellulose derivatives such as methyl, carboxymethyl and hydroxyethyl cellulose, polyethylene glycols of MWt 4,000–10,000 and polymeric materials such as polyvinyl pyrrolidone.

Agglomerated particulate precursor material does not itself provide the benefits of the invention but is a preferred form of the precursor to which the organic acid compound is applied as a surface treatment.

The organic acid compound must satisfy several criteria. Firstly it must be a solid at ambient temperatures and so must have a Melting Point of at least 30° C. and preferably of at least 40° C. Preferred organic acid compounds will have a Melting Point in excess of 50° C.

Secondly the organic acid compound must be highly soluble in water at ambient temperatures, highly soluble being defined for the purposes of the present invention as at least 5 g of the acid dissolving in 100 g of distilled water at 20° C. Preferably the organic acid compound has a solubility of at least 20 g/100 g of water at 20° C. and most preferably the organic acid compound will dissolve in its own weight of water at 20° C.

Thirdly the organic acid compound should have no more than a minor effect, and preferably substantially no effect, on the rate of perhydrolysis of the peroxyacid bleach precursor under well agitated unconstrained conditions. Unconstrained, well agitated conditions are defined for the purposes of the present invention as those existing in the Beaker Perhydrolysis Test described in detail hereinafter. A treatment material that has 'no more than a minor effect' on the rate of perhydrolysis of the precursor is defined, for the purposes of the present invention, as that which after 3 minutes in the Beaker Perhydrolysis Test at 20° C., permits the production of at least 90% of the peroxyacid that is produced under the same conditions by the untreated bleach precursor material. Preferably the rates of perhydrolysis of treated and untreated material are substantially identical.

Organic acid compounds suitable as treating agents for the purposes of the present invention comprise aliphatic or aromatic monomeric or oligomeric carboxylates and preferably comprise monomeric aliphatic carboxylic acids. Examples of such aliphatic acid compounds are glycolic, glutamic, citraconic, succinic, 1-lactic and citric acids. The acids are applied at levels of from 2% to 20% by weight of the treated particulate, more preferably from 2% to 15% and most preferably from 3% to 10% by weight of the treated particulate. Glycolic acid at a level of approximately 5% by weight of the treated particulate is a particularly preferred surface treating agent.

The surface treatment of the bleach precursor particulate with the organic acid compound can be carried out in several ways and the process itself is not critical to the present invention.

The organic acid compound may be sprayed on as a molten material or as a solution or dispersion in a solvent/carrier liquid which is subsequently removed by evaporation. The organic acid compound can also be applied as a powder coating e.g. by electrostatic techniques although this is less preferred as the adherence of powdered coating material is more difficult to achieve and can be more expensive.

Molten coating is a preferred technique for organic acid compounds of Mpt $<80°$ C. such as glycolic and Mactic acids but is less convenient for higher Melting Point acids (i.e. $>100°$ C.) such as citric acid. For organic acid compounds of Mpt$>80°$ C., spray on as a solution or dispersion is preferred. Organic solvents such as ethyl and isopropyl alcohol can be used to form the solutions or dispersions, although this will necessitate a solvent recovery stage in order to make their use economic. However, the use of organic solvents also gives rise to safety problems such as flammability and operator safety and thus aqueous solutions or dispersions are preferred.

Aqueous solutions are particularly advantageous where the organic acid compound has a high aqueous solubility (e.g. citric acid) and the solution has a sufficiently low viscosity to enable it to be handled. Preferably a concentration of at least 25% by weight of the organic acid compound in the solvent is used in order to reduce the drying/evaporation load after surface treatment has taken place. The treatment apparatus can be any of those normally used for this purpose, such as inclined rotary pans, rotary drums and fluidised beds.

Solid peroxyacid bleach precursor compositions in accordance with the invention can take a variety of physical forms. Thus the surface treated peroxyacid bleach precursor particles may themselves be incorporated into other solid compositions such as tablets, extrudates and agglomerates. The particulates can also be suspended in nonaqueous liquid compositions in which the organic acid surface treating material is insoluble and inert. However, the preferred application for the solid peroxybleach precursor compositions of the invention is as particulate components of granular detergent compositions, particularly the so-called concentrated detergent compositions that are added to a washing machine by means of a dosing device placed in the machine drum with the soiled fabric load. Concentrated granular detergent compositions dispensed into the wash liquor via a dosing device are more subject to dissolution problems than compositions added via the dispensing compartment of a washing machine because, in the initial stages of a wash cycle, the agitation in the immediate environment of the product is inhibited by the presence of the fabric load. Whilst this can constitute a benefit in permitting the development of high transient concentrations of builder and surfactant, the development of high transient peroxyacid concentrations can, as noted previously, lead to fabric and colour damage. The coated peroxyacid bleach precursor particulates of the present invention, when incorporated into concentrated detergent products delivered to the wash liquor via a dispensing device, mitigate if not eliminate this problem.

Detergent compositions incorporating the surface treated peroxy acid bleach precursor particulates will normally contain from 0.5% to 10% of the precursor, more frequently from 1% to 8% and most preferably from 2% to 6%, on a composition weight basis.

Such detergent compositions will, of course, contain a source of alkaline hydrogen peroxide necessary to form a peroxyacid bleaching species in the wash solution and preferably will also contain other components conventional in detergent compositions. Thus preferred detergent compositions will incorporate one of more of surfactants, organic and inorganic builders, soil suspending and anti-redeposition agents, suds suppressors, enzymes, fluorescent whitening agents photo activated bleaches, perfumes and colors.

Detergent compositions incorporating the surface treated particulate peroxyacid precursors of the present invention will include an inorganic perhydrate bleach, normally in the form of the sodium salt, as the source of alkaline hydrogen peroxide in the wash liquor. This perhydrate is normally incorporated at a level of from 3% to 22% by weight, more preferably from 5% to 20% by weight and most preferably from 8% to 18% by weight of the composition.

The perhydrate may be any of the inorganic salts such as perborate percarbonate, perphosphate and persilicate salts but is conventionally an alkali metal perborate or percarbonate. Whilst fabric color damage arising from compositions in accordance with the invention is low, irrespective of whether a perborate or percarbonate salt is employed, the improvement in comparison with uncoated precursor particulates is more noticeable with percarbonate bleach as this causes greater fabric color damage in the absence of any coating on the bleach precursor.

Sodium percarbonate, which is the preferred perhydrate, is an addition compound having a formula corresponding to $2Na_2CO_3 \cdot 3H_2O_2$, and is available commercially as a crystalline solid. Most commercially available material includes a low level of a heavy metal sequestrant such as EDTA, 1-hydroxyethylidene 1,1-diphosphonic acid (HEDP) or an amino-phosphonate, that is incorporated during the manufacturing process. For the purposes of the detergent composition aspect of the present invention, the percarbonate can be incorporated into detergent compositions without additional protection, but preferred executions of such compositions utilise a coated form of the material. Although a variety of coatings can be used, the most economical is sodium silicate of $SiO_2$:$Na_2O$ ratio from 1.6:1 to 3.4:1, preferably 2.8:1, applied as an aqueous solution to give a level of from 2% to 10%, (normally from 3% to 5% ) of silicate solids by weight of the percarbonate. Magnesium silicate can also be included in the coating.

The particle size range of the crystalline percarbonate is from 350 micrometers to 450 micrometers with a mean of approximately 400 micrometers. When coated, the crystals have a size in the range from 400 to 600 micrometers.

Whilst heavy metals present in the sodium carbonate used to manufacture the percarbonate can be controlled by the inclusion of sequestrants in the reaction mixture, the percarbonate still requires protection from heavy metals present as impurities in other ingredients of the product. Accordingly, in detergent compositions utilising percarbonate as the perhydrate salt, the total level of Iron, Copper and Manganese ions in the product should not exceed 25 ppm and preferably should be less than 20 ppm in order to avoid an unacceptably adverse effect on percarbonate stability. Detergent compositions in which alkali metal percarbonate bleach has enhanced stability are disclosed in the Applicants co-pending British Patent Application No. 9021761.3 (Attorney's Docket No. CM343).

A wide range of surfactants can be used in the detergent compositions. A typical listing of anionic, nonionic, ampholytic and zwitterionic classes, and species of these surfactants, is given in U.S. Pat. No. 3,929,678 issued to Laughlin and Heuring on Dec. 30, 1975. A list of suitable cationic surfactants is given in U.S. Pat. No. 4,259,217 issued to Murphy on Mar. 31, 1981.

Mixtures of anionic surfactants are suitable herein, particularly blends of sulphate, sulphonate and/or carboxylate surfactants. Mixtures of sulphonate and sulphate surfactants are normally employed in a sulphonate to sulphate weight ratio of from 5:1 to 1:2, preferably from 3:1 to 2:3, more preferably from 3:1 to 1:1.

Preferred sulphonates include alkyl benzene sulphonates having from 9 to 15, especially 11 to 13 carbon atoms in the alkyl radical, and alpha-sulphonated methyl fatty acid esters in which the fatty acid is derived from a $C_{12}$–$C_{18}$ fatty source, preferably from a $C_{16}$–$C_{18}$ fatty source. In each instance the cation is an alkali metal, preferably sodium. Preferred sulphate surfactants in such sulphonate sulphate mixtures are alkyl sulphates having from 12 to 22, preferably 16 to 18 carbon atoms in the alkyl radical. Another useful surfactant system comprises a mixture of two alkyl sulphate materials whose respective mean chain lengths differ from each other. One such system comprises a mixture of $C_{14}$–$C_{15}$ alkyl sulphate and $C_{16}$–$C_{18}$ alkyl sulphate in a weight ratio of $C_{14}$–$C_{15}$:$C_{16}$–$C_{18}$ of from 3:1 to 1:1. The alkyl sulphates may also be combined with alkyl ethoxy sulphates having from 10 to 20, preferably 10 to 16 carbon atoms in the alkyl radical and an average degree of ethoxylation of 1 to 6. The cation in each instance is again an alkali metal, preferably sodium.

Other anionic surfactants suitable for the purposes of the invention are the alkali metal sarcosinates of formula $$R—CON(R)CH_2COOM$$

wherein R is a $C_9$–$C_{17}$ linear or branched alkyl or alkenyl group, R' is a $C_1$–$C_4$ alkyl group and M is an alkali metal ion. Preferred examples are the lauroyl, Cocoyl ($C_{12}$–$C_{14}$), myristyl and oleyl methyl sarcosinates in the form of their sodium salts.

One class of nonionic surfactants useful in the present invention comprises condensates of ethylene oxide with a hydrophobic moiety, providing surfactants having an average hydrophilic-lipophilic balance (HLB) in the range from 8 to 17, preferably from 9.5 to 13.5, more preferably from 10 to 12.5. The hydrophobic (lipophilic) moiety may be aliphatic or aromatic in nature and the length of the polyoxyethylene group which is condensed with any particular hydrophobic group can be readily adjusted to yield a water-soluble compound having the desired degree of balance between hydrophilic and hydrophobic elements.

Especially preferred nonionic surfactants of this type are the $C_9$–$C_{15}$ primary alcohol ethoxylates containing 3–8 moles of ethylene oxide per mole of alcohol, particularly the $C_{14}$–$C_{15}$ primary alcohols containing 6–8 moles of ethylene oxide per mole of alcohol and the $C_{12}$–$C_{14}$ primary alcohols containing 3–5 moles of ethylene oxide per mole of alcohol.

Another class of nonionic surfactants comprises alkyl polyglucoside compounds of general formula $$RO(C_nH_{2n}O)_tZ_x$$

wherein Z is a moiety derived from glucose; R is a saturated hydrophobic alkyl group that contains from 12 to 18 carbon atoms; t is from 0 to 10 and n is 2 or 3; x is from 1.3 to 4, the compounds including less than 10% unreacted fatty alcohol and less than 50% short chain alkyl polyglucosides. Compounds of this type and their use in detergent compositions are disclosed in EP-B 0070074, 0070077, 0075996 and 0094118.

A further class of surfactants are the semi-polar surfactants such as amine oxides. Suitable amine oxides are selected from mono $C_8$–$C_{20}$, preferably $C_{10}$–$C_{14}$ N-alkyl or alkenyl amine oxides and propylene-1,3-diamine dioxides wherein the remaining N positions are substituted by methyl, hydroxyethyl or hydroxpropyl groups.

Cationic surfactants can also be used in the detergent compositions herein and suitable quaternary ammonium surfactants are selected from mono $C_8$–$C_{16}$, preferably $C_{10}$–$C_{14}$ N-alkyl or alkenyl ammonium surfactants wherein remaining N positions are substituted by methyl, hydroxyethyl or hydroxypropyl groups.

The detergent compositions comprise from 5% to 20% of surfactant but more usually comprise from 7% to 20%, more preferably from 10% to 15% surfactant by weight of the compositions.

Combinations of surfactant types are preferred, more especially anionic-nonionic and also anionic-nonionic-cationic blends. Particularly preferred combinations are described in GB-A-2040987 and EP-A-0087914. Although the surfactants can be incorporated into the compositions as mixtures, it is preferable to control the point of addition of each surfactant in order to optimise the physical characteristics of the composition and avoid processing problems. Preferred modes and orders of surfactant addition are described hereinafter.

Another highly preferred component of detergent compositions incorporating the coated peroxy acid precursor particulates of the invention is a detergent builder system comprising one or more non-phosphate detergent builders. These can include, but are not restricted to alkali metal carbonates, bicarbonates, silicates, aluminosilicates, monomeric polycarboxylates, homo or copolymeric polycarboxylic acids or their salts in which the polycarboxylic acid comprises at least two carboxylic radicals separated from each other by not more than two carbon atoms, organic phosphonates and aminoalkylene poly (alkylene phosphonates) and mixtures of any of the foregoing. The builder system is present in an amount of from 25% to 60% by weight of the composition, more preferably from 30% to 60% by weight.

Preferred builder systems are free of boron compounds and any polymeric organic materials are preferably biodegradable.

Suitable silicates are those having an $SiO_2$:$Na_2O$ ratio in the range from 1.6 to 3.4, the so-called amorphous silicates of $SiO_2$:$Na_2O$ ratios from 2.0 to 2.8 being preferred. These materials can be added at various points of the manufacturing process, such as in a slurry of components that are spray dried or in the form of an aqueous solution serving as an agglomerating agent for other solid components, or, where the silicates are themselves in particulate form, as solids to the other particulate components of the compositon. However, for compositions in which the percentage of spray dried components is low i.e. 30%, it is preferred to include the amorphous silicate in the spray-dried components.

Within the silicate class, highly preferred materials are crystalline layered sodium silicates of general formula $$NaMSi_xO_{2x+1}.yH_2O$$

wherein M is sodium or hydrogen, x is a number from 1.9 to 4 and y is a number from 0 to 20. Crystalline layered sodium silicates of this type are disclosed in EP-A-0164514 and methods for their preparation are disclosed in DE-A-3417649 and DE-A-3742043. For the purposes of the present invention, x in the general formule above has a value of 2, 3 or 4 and is preferably 2. More preferably M is sodium and y is 0 and preferred examples of this formula comprise the $\gamma$ and $\delta$ forms of $Na_2Si_2O_5$. These materials are available from Hoechst AG FRG as respectively NaSKS-11 and NaSKS-6. The most preferred material is —$Na_2Si_2O_5$, (NaSKS-6). Crystalline layered silicates are incorporated either as dry mixed solids, or as solid components of agglomerates with other components.

Whilst a range of aluminosilicate ion exchange materials can be used, preferred sodium aluminosilicate zeolites have the unit cell formula $$Na_z[(AlO_2)_z(SiO_2)_y]xH_2O$$

wherein z and y are at least 6; the molar ratio of z to y is from 1.0 to 0.5 and x is at least 5, preferably from 7.5 to 276, more preferably from 10 to 264. The aluminosilicate materials are in hydrated form and are preferably crystalline, containing from 10% to 28%, more preferably from 18% to 22% water in bound form.

The above aluminosilicate ion exchange materials are further characterised by a particle size diameter of from 0.1 to 10 micrometers, preferably from 0.2 to 4 micrometers. The term "particle size diameter" herein represents the average particle size diameter of a given ion exchange material as determined by conventional analytical techniques such as, for example, microscopic determination utilizing a scanning electron microscope or by means of a laser granulometer. The aluminosilicate ion exchange materials are further characterised by their calcium ion exchange capacity, which is at least 200 mg equivalent of $CaCO_3$ water hardness/g of aluminosilicate, calculated on an anhydrous basis, and which generally is in the range of from 300 mg eq./g to 352 mg eq./g. The aluminosilicate ion exchange materials herein are still further characterised by their calcium ion exchange rate which is at least 130 mg equivalent of $CACO_3$/liter/minute/(g/liter) [2 grains $Ca^{++}$/gallon/minute/gram/gallon)] of aluminosilicate (anhydrous basis), and which generally lies within the range of from 130 mg equivalent of $CaCO_3$/liter/minute/(-gram/liter) [2 grains/gallon/minute/(gram/gallon)] to 390 mg equivalent of $CaCO_3$/liter/minute/(gram/liter) [6 grains/gallon/minute/(gram/gallon)], based on calcium ion hardness.

Optimum aluminosilicates for builder purposes exhibit a calcium ion exchange rate of at least 260 mg equivalent of $CaCO_3$/liter/minute/(gram/liter) [4 grains/gallon/minute/(gram/gallon)].

Aluminosilicate ion exchange materials useful in the practice of this invention are commercially available and can be naturally occurring materials, but are preferably synthetically derived. A method for producing aluminosilicate ion exchange materials is discussed in U.S. Pat. No. 3,985,669. Preferred synthetic crystalline aluminosilicate ion exchange materials useful herein are available under the designations Zeolite A, Zeolite B, Zeolite X, Zeolite HS and mixtures thereof. In an especially preferred embodiment, the crystalline aluminosilicate ion exchange material is Zeolite A and has the formula $$Na_{12}[(AlO_2)_{12}(SiO_2)_{12}].xH_2O$$

wherein x is from 20 to 30, especially 27. Zeolite X of formula $Na_{86}[(AlO_2)_{86}(SiO_2)_{106}]$. 276 $H_2O$ is also suitable, as well as Zeolite HS of formula $Na_6[(AlO_2)_6(SiO_2)_6]$ 7.5 $H_2O$).

Suitable water-soluble monomeric or oligomeric carboxylate builders can be selected from a wide range of compounds but such compounds preferably have a first carboxyl logarithmic acidity/constant ($pK_1$) of less than 9, preferably of between 2 and 8.5, more preferably of between 4 and 7.5.

The logarithmic acidity constant is defined by reference to the equilibrium $$H^+ + A \rightleftharpoons H^+A$$

where A is the fully ionized carboxylate union of the builder salt.

The equilibrium constant is therefore

The equilibrium constant is therefore $$K_1 = \frac{(H^+\ A)}{(H^+)\ (A)}$$

and $pK_1 = \log_{10}K$.

For the purposes of this specification, acidity constants are defined at 25° C. and at zero ionic strength. Literature values are taken where possible (see Stability Constants of Metal-Ion Complexex, Special Publication No. 25, The Chemical Society, London): where doubt arises they are determined by potentiometric titration using a glass electrode.

Preferred carboxylates can also be defined in terms of their calcium ion stability constant ($pK_{Ca++}$) defined, analogously to $pK_1$, by the equations $$pK_{Ca++} = \log_{10}K_{Ca++}$$

$$\text{where } K_{Ca++} = \frac{(Ca^{++}\ A)}{(Ca^{++})\ (A)}$$

Preferably, the polycarboxylate has a $pK_{Ca++}$ in the range from about 2 to about 7 especially from about 3 to about 6. Once again literature values of stability constant are taken where possible. The stability constant is defined at 25° C. and at zero ionic strength using a glass electrode method of measurement as described in Complexation in Analytical Chemistry by Anders Ringbom (1963).

The carboxylate or polycarboxylate builder can be monomeric or oligomeric in type although monomeric polycarboxylates are generally preferred for reasons of cost and performance.

Monomeric and oligomeric builders can be selected from acyclic, alicyclic, heterocyclic and aromatic carboxylates having the general formulae (a)

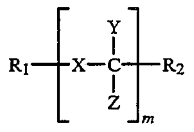

(b)

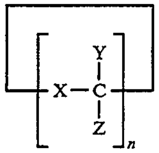

or (c)

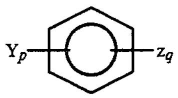

wherein $R_1$ represents H,$C_{1-30}$ alkyl or alkenyl optionally substituted by hydroxy, carboxy, sulfo or phosphono groups or attached to a polyethylenoxy moiety containing up to 20 ethyleneoxy groups; $R_2$ represents H,$C_{1-4}$ alkyl, alkenyl or hydroxy alkyl, or alkaryl, sulfo, or phosphono groups;

X represents a single bond; O; S; SO; $SO_2$; or $NR_1$;

Y represents H; carboxy;hydroxy; carboxymethyloxy; or $C_{1-30}$ alkyl or alkenyl optionally substituted by hydroxy or carboxy groups;

Z represents H; or carboxy;

m is an integer from 1 to 10;

n is an integer from 3 to 6;

p, q are integers from 0 to 6, p+q being from 1 to 6; and wherein, X, Y, and Z each have the same or different representations when repeated in a given molecular formula, and wherein at least one Y or Z in a molecule contain a carboxyl group.

Suitable carboxylates containing one carboxy group include lactic acid, glycolic acid and ether derivatives thereof as disclosed in Belgian Patent Nos. 831,368, 821,369 and 821,370.

Polycarboxylates containing two carboxy groups include the water-soluble salts of succinic acid, malonic acid, (ethylenedioxy) diacetic acid, maleic acid, diglycolic acid, tartaric acid, tartronic acid and fumaric acid, as well as the ether carboxylates described in German Offenlegenschrift 2,446,686, and 2,446,687 and U.S. Pat. No. 3,935,257 and the sulfinyl carboxylates described in Belgian Patent No. 840,623. Polycarboxylates containing three carboxy groups include, in particular, water-soluble citrates, aconitrates and citraconates as well as succinate derivatives such as the carboxymethyloxysuccinates described in British Patent No. 1,379,241, lactoxysuccinates described in British Patent No. 1,389,732, and aminosuccinates described in Netherlands Application 7205873, and the oxypolycarboxylate materials such as 2-oxa-1,1,3-propane tricarboxylates described in British Patent No. 1,387,447.

Polycarboxylates containing four carboxy groups incldue oxydisuccinates disclosed in British Patent No. 1,261,829, 1,1,2,2-ethane tetracarboxylates, 1,1,3,3-propane tetracarboxylates and 1,1,2,3-propane tetracarboxylates. Polycarboxylates containing sulfo substituents include the sulfosuccinate derivatives disclosed in British Patent Nos. 1,398,421 and 1,398,422 and in U.S. Pat. No. 3,936,448, and the sulfonated pyrolysed citrates described in British Patent No. 1,439,000.

Alicyclic and heterocyclic polycarboxylates include cyclopentane-cis,cis,cis-tetracarboxylates, cyclopentadienide pentacarboxylates, 2,3,4,5-tetrahydrofuran-cis,-cis,cis-tetracarboxylates, 2,5-tetrahydrofuran-cis-dicarboxylates, 2,2,5,5-tetrahydrofuran-tetracarboxylates, 1,2,3,4,5,6-hexane-hexacarboxylates and carboxymethyl derivatives of polyhydric alcohols such as sorbitol, mannitol and xylitol. Aromatic polycarboxylates include mellitic acid, pyromellitic acid and the phthalic acid derivatives disclosed in British Patent No. 1,425,343.

Of the above, the preferred polycarboxylates are hydroxycarboxylates containing up to three carboxy groups per molecule, more particularly citrates.

The parent acids of the monomeric or oligomeric polycarboxylate chelating agents or mixtures thereof with their salts, e.g. citric acid or citrate/citric acid mixtures are also contemplated as components of builder systems of detergent compositions in accordance with the present invention.

Other suitable water soluble organic salts are the homo- or co-polymeric polycarboxylic acids or their salts in which the polycarboxylic acid comprises at least two carboxyl radicals separated from each other by not more than two carbon atoms. Polymers of the latter type are disclosed in GB-A-1,596,756. Examples of such salts are polyacrylates of MWt 2000-5000 and their copolymers with maleic anhydride, such copolymers having a molecular weight of from 20,000 to 70,000, especially about 40,000. These materials are normally used at levels of from 0.5% to 10% by weight more preferably from 0.75% to 8%, most preferably from 1% to 6% by weight of the composition.

Organic phosphonates and amino alkylene poly (alkylene phosphonates) include alkali metal ethane 1-hydroxy diphosphonates, nitrilo trimethylene phosphonates, ethylene diamine tetra methylene phosphonates and diethylene triamine penta methylene phosphonates, although these materials are less preferred where the minimisation of phosphorus compounds in the compositions is desired.

For the purposes of detergent compositions embodying the surface treated bleach precursor particulates of the invention, the non-phosphate builder ingredient will comprise from 25% to 60% by weight of the compositions, more preferably from 30% to 60% by weight. Within the preferred compositions, sodium aluminosilicate such as Zeolite A will comprise from 20% to 60% by weight of the total amount of builder, a monomeric or oligomeric carboxylate will comprise from 10% to 30% by weight of the total amount of builder and a crystalline layered silicate will comprise from 10% to 65% by weight of the total amount of builder. In such compositions the builder ingredient preferably also incorporates a combination of auxiliary inorganic and organic builders such as sodium carbonate and maleic anhydride/acrylic acid copolymers in amounts of up to 35% by weight of the total builder.

Anti-redeposition and soil-suspension agents suitable herein include cellulose derivatives such as methylcellulose, carboxymethylcellulose and hydroxyethycellulose, and homo-or co-polymeric polycarboxylic acids or their salts. Polymers of this type include copolymers of maleic anhydride with ethylene, methylvinyl ether or methacrylic acid, the maleic anhydride constituting at least 20 mole percent of the copolymer. These materials are normally used at levels of from 0.5% to 10% by weight, more preferably from 0.75% to 8%, most preferably from 1% to 6% by weight of the composition.

Other useful polymeric materials are the polyethylene glycols, particularly those of molecular weight 1000–10000, more particularly 2000 to 8000 and most preferably about 4000. These are used at levels of from 0.20% to 5% more preferably from 0.25% to 2.5% by weight. These polymers and the previously mentioned homo- or co-polymeric polycarboxylate salts are valuable for improving whiteness maintenance, fabric ash deposition, and cleaning performance on clay, proteinaceous and oxidizable soils in the presence of transition metal impurities.

Preferred optical brighteners are anionic in character, examples of which are disodium $4,4^1$-bis-(2-diethanolamino-4-anilino-s-triazin-6-ylamino)stilbene-$2:2^1$ disulphonate, disodium $4,4^1$-bis-(2-morpholino-4-anilino-2-triazin-6-ylaminostilbene-$2:2^1$-disulphonate, disodium $4,4^1$-his-(2,4-dianilino-s-triazin-6-ylamino)stilbene-$2:2^1$-disulphonate, monosodium $4^1,4^{11}$-bis-(2,4-dianilino-s-triazin-6 ylamino)stilbene-2-sulphonate, disodium $4,4^1$-bis-(2-anilino-4-(N-methyl-N-2-hydroxyethylamino)-2-triazin-6-ylamino)stilbene-$2,2^1$-disulphonate, disodium $4,4^1$-bis-(4-phenyl-2,1,3-triazol-2-yl)stilbene-$2,2^1$ disulphonate, disodium $4,4^1$bis(2-anilino-4-(1-methyl-2-hydroxyethylamino)-s-triazin-6-ylamino)stilbene-$2,2^1$disulphonate and sodium 2(stilbyl-$4^{11}$-(naphtho-$1^1,2^1$:4,5)-1,2,3-triazole-$2^{11}$-sulphonate.

Soil-release agents useful in compositions of the present invention are conventionally copolymers or terpolymers of terephthalic acid with ethylene glycol and/or propylene glycol units in various arrangements. Examples of such polymers are disclosed in the commonly assigned U.S. Pat. Nos. 411688:5 and 4711730 and European Published Patent Application No. 0272033. A particular preferred polymer in accordance with EP-A-0272033 has the formula $(CH_3(PEG)_{43})_{0.75}(POH)_{0.25}[T\text{-}PO)_{2.8}(T\text{-}PEG)_{0.4}]T(PO\text{-}H)_{0.25}((PEG)_{43}CH_3)_{0.75}$ where PEG is $-(OC_2H_4)O-$,PO is $(OC_3H_6O)$ and T is $(pCOC_6H_4CO)$, Certain polymeric materials such as polyvinyl pyrrolidones typically of MWt 5000–20000, preferably 10000–15000, also form useful agents in preventing the transfer of labile dyestuffs between fabrics during the washing process.

Another optional detergent composition ingredient is a suds suppressor, exemplified by silicones, and silica-silicone mixtures. Silicones can be generally represented by alkylated polysiloxane materials while silica is normally used in finely divided forms, exemplified by silica aerogels and xerogels and hydrophobic silicas of various types. These materials can be incorporated as particulates in which the suds suppressor is advantageously releasably incorporated in a water-soluble or water-dispersible, substantially non-surface-active detergent-impermeable carrier. Alternatively the suds suppressor can be dissolved or dispersed in a liquid carrier and applied by spraying on to one or more of the other components.

As mentioned above, useful silicone suds controlling agents can comprise a mixture of an alkylated siloxane, of the type referred to hereinbefore, and solid silica. Such mixtures are prepared by affixing the silicone to the surface of the solid silica. A preferred silicone suds controlling agent is represented by a hydrophobic silanated (most preferably trimethyl-silanated) silica having a particle size in the range from 10 nanometers to 20 nanometers and a specific surface area above 50 $m^2/g$, intimately admixed with dimethyl silicone fluid having a molecular weight in the range from about 500 to about 200,000 at a weight ratio of silicone to silanated silica of from about 1:1 to about 1:2.

A preferred silicone suds controlling agent is disclosed in Bartollota et al. U.S. Pat. No. 3,933,672. Other particularly useful suds suppressors are the self-emulsifying silicone suds suppressors, described in German Patent Application DTOS 2,646,126 published Apr. 28, 1977. An example of such a compound is DC0544, commercially available from Dow Corning, which is a siloxane/glycol copolymer.

The suds suppressors described above are normally employed at levels of from 0.001% to 0.5% by weight of the composition, preferably from 0.01% to 0.1% by weight.

The preferred methods of incorporation comprise either application of the suds suppressors in liquid form by spray-on to one or more of the major components of the composition or alternatively the formation of the suds suppressors into separate particulates that can then be mixed with the other solid components of the composition. The incorporation of the suds modifiers as separate particulates also permits the inclusion therein of other suds controlling materials such as $C_{20}$–$C_{24}$ fatty acids, microcrystalline waxes and high MWt copolymers of ethylene oxide and propylene oxide which would otherwise adversely affect the dispersibility of the matrix. Techniques for forming such suds modifying particulates are disclosed in the previously mentioned Bartolotta et al U.S. Pat. No. 3,933,672.

Another optional ingredient useful in the present invention is one or more enzymes.

Preferred enzymatic materials include the commercially available amylases, neutral and alkaline proteases, lipases, esterases and cellulases conventionally incorporated into detergent compositions. Suitable enzymes are discussed in U.S. Pat. Nos. 3,519,570 and 3,533,139.

Fabric softening agents can also be incorporated into detergent compositions in accordance with the present invention. These agents may be inorganic or organic in type. Inorganic softening agents are examplified by the smectite clays disclosed in GB-A-1,400,898. Organic fabric softening agents include the water insoluble tertiary amines as disclosed in GB-A-1514276 and EP-B-0011340.

Their combination with mono $C_{12}$–$C_{14}$ quaternary ammonium salts is disclosed in EP-B-0026527 & 528. Other useful organic fabric softening agents are the dilong chain amides as disclosed in EP-B-0242919. Additional organic ingredients of fabric softening systems include high molecular weight polyethylene oxide materials as disclosed in EP-A-0299575 and 0313146.

Levels of smectite clay are normally in the range from 5% to 15%, more preferably from 8% to 12% by weight, with the material being added as a dry mixed component to the remainder of the formulation. Organic fabric softening agents such as the water-insoluble tertiary amines or dilong chain amide materials are incorporated at levels of from 0.5% to 5% by weight, normally from 1% to 3% by weight, whilst the high molecular weight polyethylene oxide materials and the water soluble cationic materials are added at levels of from 0.1% to 2%, normally from 0.15% to 1.5% by weight. Where a portion of the composition is spray dried, these materials can be added to the aqueous slurry fed to the spray drying tower, although in some instances it may be more convenient to add them as a dry mixed particulate, or spray them as a molten liquid on to other solid components of the composition.

The surface treated peroxyacid bleach precursor particulates of the present invention are particularly useful in concentrated granular detergent compositions that are characterised by a relatively high density in comparison with conventional laundry detergent compositions. Such high density compositions have a bulk density of at least 650 g/liter, more usually at least 700 g/liter and more preferably in excess of 800 g/liter.

Bulk density is measured by means of a simple funnel and cup device consisting of a conical funnel moulded rigidly on a base and provided with a flap valve at its lower extremity to allow the contents of the funnel to be emptied into an axially aligned cylindrical cup disposed below the funnel. The funnel is 130 mm and 40 mm at its respective upper and lower extremities. It is mounted so that the lower extremity is 140 mm above the upper surface of the base. The cup has an overall height of 90 mm, an internal height of 87 mm and an internal diameter of 84 mm. Its nominal volume is 500 ml.

To carry out a measurement, the funnel is filled with powder by hand pouring, the flap valve is opened and powder allowed to overfill the cup. The filled cup is removed from the frame and excess powder removed from the cup by passing a straight edged implement e.g. a knife, across its upper edge. The filled cup is then weighed and the value obtained for the weight of powder doubled to provide the bulk density in g/liter. Replicate measurements are made as required.

Concentrated detergent compositions also normally incorporate at least one multi-ingredient component i.e. they do not comprise compositions formed merely by dry-mixing individual ingredients. Compositions in which each individual ingredient is dry-mixed are generally dusty, slow to dissolve and also tend to cake and develop poor particle flow characteristics in storage.

Subject to the above bulk density and component content limitations, the compositions of the invention can be made via a variety of methods including dry mixing, spray drying, agglomeration and granulation and preferred methods involve combinations of these techniques. A preferred method of making the compositions involves a combination of spray drying, agglomeration in a high speed mixer and dry mixing.

Preferred detergent compositions in accordance with the invention comprise at least two particulate multi-ingredient components. The first component comprises at least 15%, conventionally from 25% to 50%, but more preferably no more than 35% by weight of the composition and the second component from 1% to 50%, more preferably 10% to 40% by weight of the composition.

The first component comprises a particulate incorporating an anionic surfactant in an amount of from 0.75% to 40% by weight of the powder and one or more inorganic and/or organic salts in an amount of from 99.25% to 60% by weight of the powder. The particulate can have any suitable form such as granules, flakes, prills, marumes or noodles but is preferably granular. The granules themselves may be agglomerates formed by pan or drum agglomeration or by in-line mixers but are customarily spray dried particles produced by a atomising an aqueous slurry of the ingredients in a hot air stream which removes most of the water. The spray dried granules are then subjected to densification steps, e.g. by high speed curer mixers and/or cornpatting mills, to increase density before being reagglomerated. For illustrative purposes, the first component is described hereinafter as a spray dried powder.

Suitable anionic surfactants for the purposes of the first component have been found to be slowly dissolving linear alkyl sulfate salts in which the alkyl group has an average of from 16 to 22 carbon atoms, and linear alkyl carboxylate salts in which the alkyl group has an average of from 16 to 24 carbon atoms. The alkyl groups for both types of surfactant are preferably derived from natural sources such as tallow fat and marine oils.

The level of anionic surfactant in the spray dried powder forming the first component is from 0.75% to 40% by weight, more usually 2.5% to 25% preferably from 3% to 20% and most preferably from 5% to 15% by weight. Water-soluble surfactants such as linear alkyl benzene sulphonates or $C_{14}$–$C_{15}$ alkyl sulphates can be included or alternatively may be applied subsequently to the spray dried powder by spray on.

The other major ingredient of the spray dried powder is one or more inorganic or organic salts that provide the crystalline structure for the granules. The inorganic and/or organic salts may be water-soluble or water-insoluble, the latter type being comprised by the, or the major part of the, water-insoluble builders where these form part of the builder ingredient. Suitable water soluble inorganic salts include the alkali metal carbonates and bicarbonates. Alkali metal silicates other than crystalline layered silicates can also be present in the spray dried granule provided that aluminosilicate does not form part of the spray dried component. However, in concentrated detergent compositions it is preferred that water-soluble sulphate, particularly sodium sulphate, should not be present at a level of more than 2.5% by weight of the composition. Preferably no sodium sulphate is added as a separate ingredient and its incorporation as a by-product e.g. with sulph(on)ated surfactants, should be minimised.

Where an aluminosilicate zeolite forms the, or part of the, builder ingredient, it is preferred that it is not added directly by dry-mixing to the other components, but is incorporated into the multi-ingredient component(s). Where incorporation of the zeolite takes place in the spray-dried granule, any silicate present should not form part of the spray-dried granule. In these circumstances, incorporation of the silicate can be achieved in several ways, e.g. by producing a separate silicate-containing spray-dried particulate, by incorporating the silicate into an agglomerate of other ingredients, or more preferably by adding the silicate as a dry mixed solid ingredient.

The first component can also include up to 15% by weight of miscellaneous ingredients such as brighteners, anti-redeposition agents, photoactivated bleaches (such as tetrasulfonated zinc phthalocyanine) and heavy metal sequestering agents. Where the first component is a spray dried powder it will normally be dried to a moisture content of from 7% to 11% by weight, more preferably from 8% to 10% by weight of the spray dried powder. Moisture contents of powders produced by other processes such as agglomeration may be lower and can be in the range 1–10% by weight.

The particle size of the first component is conventional and preferably not more than 5% by weight should be above 1.4 mm, while not more than 10% by weight should be less than 0.15 mm in maximum dimension. Preferably at least 60%, and most preferably at least 80%, by weight of the powder lies between 0.7 mm and 0.25 mm in size. For spray dried powders, the bulk density of the particles from the spray drying tower is conventionally in the range from 540 to 600 g/liter and this is then enhanced by further processing steps such as size reduction in a high speed cutter/mixer followed by compaction. Alternatively, processes other than spray drying may be used to form a high density particulate directly.

A second component of a preferred composition in accordance with the invention is another multi-ingredient particulate containing a water soluble surfactant.

This may be anionic, nonionic, cationic or semipolar in type or a mixture of any of these. Suitable surfactants are listed hereinbefore but preferred surfactants are $C_{14}$–$C_{15}$ alkyl sulphates, linear $C_{11}$–$C_{15}$ alkyl benzene sulphonates and fatty $C_{14}$–$C_{18}$ methyl ester sulphonates.

The second component may have any suitable physical form, i.e. it may take the form of flakes, prills, marumes, noodles, ribbons, or granules which may be spray-dried or non spray-dried agglomerates. Although the second component could in theory comprise the water soluble surfactant on its own, in practice at least one organic or inorganic salt is included to facilitate processing. This provides a degree of crystallinity, and hence acceptable flow characteristics, to the particulate and may be any one or more of the organic or inorganic salts present in the first component.

The particle size range of the second component should be such as to obviate segregation from the particles of the first component when blended therewith. Thus not more than 5% by weight should be above 1.4 mm while not more than 10% should be less than 0.15 mm in maximum dimension.

The bulk density of the second component will be a function of its mode of preparation. However, the preferred form of the second component is a mechanically mixed agglomerate which may be made by adding the ingredients dry or with an agglomerating agent to a pan agglomerator, Z blade mixer or more preferably an in-line mixer such as those manufactured by Schugi (Holland) BV, 29 Chroomstraat 8211 AS, Lelystad, Netherlands and Gebruder Lodige Maschinenbau GmbH, D-4790 Paderborn 1, Elsenerstrasse 7-9, Postlath 2050 F.R.G. By this means the second component can be given a bulk density in the range from 650 g/liter to 1190 g/liter more preferably from 750 g/liter to 850 g/liter.

Preferred compositions include a level of alkali metal carbonate in the second component corresponding to an amount of from 3% to 15% by weight of the composition, more preferably from 5% to 12% by weight. This will provide a level of carbonate in the second component of from 20% to 40% by weight.

A highly preferred ingredient of the second component is also a hydrated water insoluble aluminosilicate ion exchange material of the synthetic zeolite type, described hereinbefore, present at from 10% to 35% by weight of the second component. The amount of water insoluble aluminosilicate material incorporated in this way is from 1% to 10% by weight of the composition, more preferably from 2% to 8% by weight.

In one process for preparing the second component, the surfactant salt is formed in situ in an inline mixer. The liquid acid form of the surfactant is added to a mixture of particulate anhydrous sodium carbonate and hydrated sodium aluminosilicate in a continuous high speed blender, such as a Lodige KM mixer, and neutralised to form the surfactant salt whilst maintaining the particulate nature of the mixture. The resultant agglomerated mixture forms the second component which is then added to other components of the product. In a variant of this process, the surfactant salt is pre-neutralised and added as a viscous paste to the mixture of the other ingredients. In the variant, the mixer serves merely to agglomerate the ingredients to form the second component.

In a particularly preferred process for making detergent compositions incorporating the coated peroxyacid bleach precursor particulates of the invention, part of the spray dried product comprising the first granular component is diverted and subjected to a low level of nonionic surfactant spray on before being reblended with the remainder. The second granular component is made using the preferred process described above. The first and second components together with the coated bleach precursor particulate and the perhydrate bleach, other dry mix ingredients such as any carboxylate chelating-agent, soil-release polymer, silicate of conventional or crystalline layered type, and enzyme are then fed to a conveyor belt, from which they are transferred to a horizontally rotating drum in which perfume and silicone suds suppressor are sprayed on to the product. In highly preferred compositions, a further drum mixing step is employed in which a low (approx. 2% by weight) level of finely divided crystalline material is introduced to increase density and improve granular flow characteristics.

In preferred concentrated detergent products incorporating an alkali metal percarbonate as the perhydrate salt it has been found necessary to control several aspects of the product such as its heavy metal ion content and its equilibrium relative humidity. Sodium percarbonate-containing compositions of this type having enhanced stability are disclosed in the commonly assigned British Application No. 9021761.3 filed Oct. 6 1990 Attorney's Docket No. CM343.

Compositions in accordance with the invention can also benefit from delivery systems that provide transient localised high concentrations of product in the drum of an automatic washing machine at the start of the wash cycle, thereby also avoiding problems associated with loss of product in the pipework or sump of the machine.

Delivery to the drum can most easily be achieved by incorporation of the composition in a bag or container from which it is rapidly releasable at the start of the wash cycle in response to agitation, a rise in temperature or immersion in the wash water in the drum. Alternatively the washing machine itself may be adapted to permit direct addition of the composition to the drum e.g. by a dispensing arrangement in the access door.

Products comprising a detergent composition enclosed in a bag or container are usually designed in such a way that container integrity is maintained in the dry state to prevent egress of the contents when dry, but are adapted for release of the container contents on exposure to a washing environment, normally on immersion in an aqueous solution.

Usually the container will be flexible, such as a bag or pouch. The bag may be of fibrous construction coated with a water impermeable protective material so as to retain the contents, such as is disclosed in European published Patent Application No. 0018678. Alternatively it may be formed of a water-insoluble synthetic polymeric material provided with an edge seal or closure designed to rupture in aqueous media as disclosed in European published Patent Application Nos. 0011500, 0011501, 0011502, and 0011968. A convenient form of water frangible closure comprises a water soluble adhesive disposed along and sealing one edge of a pouch formed of a water impermeable polymeric film such as polyethylene or polypropylene. In a variant of the bag or container form, laminated sheet products can be employed in which a central flexible layer is impregnated and/or coated with a composition and then one or more outer layers are applied to produce a fabric-like aesthetic effect. The layers may be sealed together so as to remain attached during use or may separate on contact with water to facilitate the release of the coated or impregnated material.

An alternative laminate form comprises one layer embossed or deformed to provide a series of pouch-like containers into each of which the detergent components are deposited in measured amounts, with a second layer overlying the first layer and sealed thereto in those areas beteen the pouch-like containers where the two layers are in contact. The components may be deposited in particulate, paste or molten form and the laminate layers should prevent egress of the contents of the pouch-like containers prior to their addition to water. The layers may separate or may remain attached together on contact with water, the only requirement being that the structure should permit rapid release of the contents of the pouch-like containers into solution. The number of pouch-like containers per unit area of substrate is a matter of choice but will normally vary between 500 and 25,000 per square meter.

Suitable materials which can be used for the flexible laminate layers in this aspect of the invention include, among others, sponges, paper and woven and non-woven fabrics.

However the preferred means of carrying out the process of the invention is to introduce the composition into the liquid surrounding the fabrics that are in the drum via a reusable dispensing device having walls that are permeable to liquid but impermeable to the solid composition.

Devices of this kind are disclosed in European Patent Application Publication Nos. 0343069 & 0343070. The latter Application discloses a device comprising a flexible sheath in the form of a bag extending from a support ring defining an orifice, the orifice being adapted to admit to the bag sufficent product for one washing cycle in a washing cycle. A portion of the washing medium flows through the orifice into the bag, dissolves the product, and the solution then passes outwardly through the orifice into the washing medium. The support ring is provided with a masking arrangement to prevent egress of wetted, undissolved, product, this arrangement typically comprising radially extending walls extending from a central boss in a spoked wheel configuration, or a similar structure in which the walls have a helical form.

The invention is illustrated in the following non limiting Examples, in which all percentages are on a weight basis unless otherwise stated.

In the detergent compositions, the abbreviated component identifications have the following meanings:

| | |
|---|---|
| $C_{12}LAS$ | Sodium linear $C_{12}$ alkyl benzene sulphonate |
| TAS | Sodium tallow alcohol sulphate |
| $C_{14/15}AS$ | Sodium $C_{14}$-$C_{15}$ alkyl sulphate |
| $TAE_n$ | Tallow alcohol ethoxylated with n moles of ethylene oxide per mole of alcohol |
| 45E7 | A $C_{14-15}$ predominantly linear primary alcohol condensed with an average of 7 moles of ethylene oxide |
| $CnAE_{E6.5}$ | A $C_{12}$-$C_{13}$ primary alcohol condensed with 6.5 moles of ethylene oxide. |
| PEG | Polyethylene glycol (MWt normally follows) |
| TAED | Tetraacetyl ethylene diamine |
| Silicate | Amorphous Sodium Silicate ($SiO_2$:$Na_2O$ ratio nomally follows) |
| NaSKS-6 | Crystalline layered silicate of formula $Na_2Si_2O_5$ |
| Carbonate | Anhydrous sodium carbonate |
| CMC | Sodium carboxymethyl cellulose |
| Zeolite A | Hydrated Sodium Aluminosilicate of formula $Na_{12}(AlO_2SiO_2)_{12}.27H_2O$ having a primary particle size in the range from 1 to 10 micrometers |
| Polyacrylate | Homopolymer of acrylic acid of MWt 4000 |
| Citrate | Tri-sodium citrate dihydrate |
| Photoactivated Bleach | Tetra sulphonated Zinc phthalocyanine |
| MA/AA | Copolymer of 1:4 maleic/acrylic acid, average molecular weight about 80,000. |
| MVEMA | Maleic anhydride/vinyl methyl ether copolymer, believed to have an average molecular weight of 240,000. This material was prehydrolysed with NaOH before addition. |
| Perborate | Sodium perborate tetrahydrate of nominal formula $NaBO_2.3H_2O.H_2O_2$ |
| Perborate Monohydrate | Anhydrous sodium perborate bleach empirical formula $NaBO_2.H_2O_2$ |
| Percarbonate | Sodium Percarbonate of nominal formula $2Na_2CO_3.3H_2O_2$ |
| Enzyme | Mixed proteolytic and amylolytic enzyme sold by Novo Industries AS. |
| Brightener | Disodium 4,4'-bis(2-morpholino-4-anilino-s-triazin-6-ylamino) stilbene-2:2'-disulphonate. |
| DETPMP | Diethylene triamine penta (Methylene phosphonic acid), marketed by Monsanto under the Trade name Dequest 2060 |
| Mixed Suds Suppressor | 25% paraffin wax Mpt 50° C., 17% hydrophobic silica, 58% paraffin oil. |

For the purpose of the present invention, unrestrained dissolution conditions are defined as those existing in the Beaker Perhydrolysis Test as carried Out using a Sotax Dissolution Tester Model AT6 supplied by Sotax AG CH-4008 BASEL Switzerland. This Apparatus comprises an array of polycarbonate beakers, each capable of holding 1 liter of water, supported in a thermostatically controlled water bath. Each beaker is provided with a paddle stirrer whose speed can be controlled.

Two beakers in the Sotax Tester are employed in the perhydrolysis procedure using the following method:

1. Set water bath to required temperature (20° C.).
2. Add 1 liter distilled water to each Sotax beaker and allow to equilibrate to required temperature.
3. Sample accurately 2×10 g samples of detergent and precursor.
4. Prepare a number of titration beakers by adding: 25 ml 3:2 glacial acetic acid distilled water solution together with 2 ice cubes
5. Set the stirring speed of the Sotax to 150 rpm.
6. Add the first sample to Sotax beaker No. 1 and start the clock (t=O minutes). Add 5 ml potassium iodide solution to the first titration beaker.
7. Take a 10 ml aliquot from Sotax beaker No. 1 and discharge into the first titration beaker at t=1 minute.
8. Add the second sample to Sotax beaker No. 2 at t=1 minute and add 5 ml potassium iodide to a second titration beaker.
9. Titrate the first aliquot against 0.005 m sodium thiosulphate solution until the solution is first decolourised (The colour is slowly regenerated as the solution warms and the perhydrate reacts with the iodide).
10. Take a 10 ml aliquot from Sotax beaker No. 2 at t=2 minutes and discharge into the second titration beaker and repeat step 9.
11. Take further aliquots at the following times (t=minutes).

| Beaker No. 1 (t) | Beaker No. 2 (t) |
|---|---|
| 3 | 4 |
| 5 | 6 |
| 10 | 11 |
| 15 | 16 |
| 20 | 21 |

The aliquots from Beaker No. 1 at 1 minute and from Beaker No. 2 at 2 minutes constitute replicates and the results are averaged to give a figure from which the % perhydrolysis is calculated.

EXAMPLE 1

TAED in fine powder form (particle size 90% by weight <150 micrometers), was agglomerated with TAE25 to give particles in which 85% by weight was between 400 micrometers and 1700 micrometers. This material was divided into five fractions identified as A–F, of which fraction A was untreated and the remainder were treated as follows

| | Surface Treating Material |
|---|---|
| B | 5% octanoic acid |
| C | 5% polyacrylic acid (MWt 2,000) |
| D | 5% glycolic acid |
| E | 5% citric acid |

The treatments were all applied by hand spraying into a small coating drum. The octanoic acid was applied as a melt at 60° C. whilst the remainder were applied as aqueous solutions at ambient temperature (20° C.). The citric acid solution was 50% by weight, the glycolic acid solution was 66% by weight and the polyacrylic acid solution was 50% by weight.

Material from each fraction was then incorporated into a model detergent formulation having the composition in parts by weight.

| | |
|---|---|
| $C_{12}$LAS | 9.0 |
| TAS | 2.8 |
| Dobanol 45E7 | 3.8 |
| Zeolite A | 23.5 |
| Citrate | 7.5 |
| MA/AA | 3.75 |
| Carbonate | 17.0 |
| Silicate ($SiO_2$:$Na_2O$ = 2:1) | 4.2 |
| DETPMP | 0.4 |
| CMC | 0.5 |
| Percarbonate | 18.7 |
| TAED | 5.85 |
| Miscellaneous | 3.00 |

The five formulations were then subjected to a Beaker Perhydrolysis Test as hereinbefore described and gave the peroxyacid yields shown in Table 1. Results are given for 1,3,5,10 15 & 20 minutes elapsed time and are expressed in percent of the theoretically available weight of per acid.

TABLE I

| | minutes from start of perhydrolysis | | | | | |
|---|---|---|---|---|---|---|
| Product with TAED fraction | 1 | 3 | 5 | 10 | 15 | 20 |
| A | 37.3 | 74.2 | 86.0 | 93.9 | 97.8 | 97.2 |
| B | 23.2 | 60.1 | 75.9 | 90.8 | 97.4 | 96.5 |
| C | 29.0 | 67.2 | 77.2 | 88.2 | 90.8 | 90.0 |
| D | 37.6 | 73.7 | 85.1 | 94.9 | 97.5 | 98.6 |
| E | 36.8 | 74.5 | 87.2 | 92.5 | 96.8 | 97.6 |

It can be seen that formulations containing the fractions D & E give substantially the same peroxyacid yield as that containing fraction A, (both after 3 minutes and throughout the perhydrolysis reaction), indicating that the perhydrolysis under unconstrained dissolution conditions was substantially unaffected by the treatment. By contrast formulations containing fractions B & C showed a lower peroxy acid yield, particularly in the initial period of the perhydrolysis.

EXAMPLE 2

The formulations containg TAED fractions A & D of Example 1 were subjected to a full scale washing machine test using Miele automatic washing machines (Model W754) set to the Short Wash cycle at 40° C. Each machine was loaded with four cotton bedsheets (3.3 kg) and 100 g of the formulation was added to the fabrics in the machine drum via an Arielator (RTM) dispensing device. 12 liters of water of 150 ppm hardness (expressed as $CaCO_3$) with a Ca:Mg ratio of 3:1 was fed to each machine.

Two machines, adapted to allow opening of the loading door during the cycle for sampling purposes, were used to carry out the same procedure as employed in the Beaker Perhydrolysis Test. The Results are shown in Table II and are expressed in the same manner as for Table I

TABLE II

| | minutes from start of wash cycle | | | | | |
|---|---|---|---|---|---|---|
| Product with TAED fraction | 1 | 3 | 5 | 10 | 15 | 20 |
| A | 31.5 | 56.1 | 82.1 | 92.1 | 89.4 | 89.4 |
| D | 9.1 | 50.6 | 68.0 | 99.5 | 98.5 | 96.7 |

It can be seen that, under the constrained dissolution conditions of a loaded washing machine, the product containing fraction D (the glycolic acid-surface treated TAED), perhydrolyses more slowly than the product containing fraction A (the untreated material), during the initial stages of the wash cycle. This shows that the glycolic acid surface treatment of the TAED inhibits perhydrolysis during the period of high localised product concentration existing at the start of the wash cycle, where the high aqueous solubility of the acid is believed to create a low pH environment around the TAED particles. Nevertheless, in the later stages of the wash cycle, the yield of peroxy acid from the treated TAED is better than from the untreated material, indicating that delayed release of the TAED results in its more effective conversion into peroxy acid.

EXAMPLE 3

A full scale washing machine test was carried out comparing three formulations containing fractions B, C & D of the surface treated precursor of Example 1. The fractions were added respectively to a modified form of the detergent formulation of Example 1 in which the sodium percarbonate was replaced by the same weight of sodium perborate monohydrate.

The washing machine comparison employed the same technique as that used in Example 2, save that the wash temperature was 20° C. This temperature is typical of that found during the initial cold fill stage of European wash cycles. Results are shown below in Table III

TABLE III

| | minutes from start of wash cycle | | | | | |
|---|---|---|---|---|---|---|
| Formulation with fraction | 1 | 3 | 5 | 10 | 15 | 20 |
| B | 4.6 | 33.6 | 54.7 | 74.8 | 78.0 | 80.3 |
| C | 4.6 | 32.6 | 54.3 | 80.7 | 84.8 | 88.0 |
| D | 3.65 | 54.8 | 70.8 | 83.0 | 88.5 | 85.0 |

This shows that a peroxy acid bleach precursor surface treated in accordance with the invention provides superior yields of peroxy acid under realistic washing conditions, compared to surface treatment precursors that are not in accordance with the invention.

EXAMPLE IV

A washing machine comparison of formulations similar to that carried out in Example III and incorporating precursor fractions A,B, C & E was carried out to include bleach-sensitive coloured fabric swatches in the fabric load. These swatches were made of 100% lambswool woven fabric with purple 48 dye (Design No. W3970) supplied by Borval Fabrics, Albert Street, Huddersfield, West Yorkshire; England. 24 replicates of each treatment were performed and the swatches were then graded visually for fabric color damage by an expert panel using the following grading system.

Three colored swatches demonstrating differing degrees of colour damage are used as standards to establish a 4 point scale in which 1 represents 'virtually no damage' and 4 represents 'very damaged'. The three standards are used to define the mid points between the various descriptions of color damage viz

| | |
|---|---|
| 1 | virtually no damage |
| 2 | slight damage |
| 3 | damage |
| 4 | very damaged |

Two expert panellists are used and their results are averaged.

Using this technique to compare colour damage resulting from use of formulations containing precursor fractions A,B,C & E the following results were obtained

| | % of swatches having grade | | | | |
|---|---|---|---|---|---|
| formulation with precursor fraction | 1 | 2 | 3 | 4 | Overall Grade |
| A | 50 | 29.2 | 8.33 | 12.5 | 1.83 |
| B | 52.2 | 26.1 | 21.7 | 0 | 1.70 |
| C | 47.8 | 30.4 | 17.4 | 4.4 | 1.78 |
| E | 66.6 | 16.6 | 10.5 | 6.2 | 1.56 |

It can be seen that a formulation incorporating fraction E in accordance with the invention produces appreciably less fabric colour damage than non surface treated precursor or surface treated precursors not in accordance with the invention.

EXAMPLE V

The washing machine comparison of Example IV was repeated using formulations containing TAED fractions A & D of Example 1, as well as an additional TAED fraction F comprising fraction A further agglomerated with 10% by weight of glycolic acid (on total agglomerate weight basis). The formulations were subjected to a coloured swatch degradation test as described in Example IV and gave the following results

| | % of swatches having grade | | | | |
|---|---|---|---|---|---|
| | 1 | 2 | 3 | 4 | Overall Grade |
| A | 16 | 20 | 25 | 38 | 2.83 |
| D | 29 | 38 | 29 | 4 | 2.08 |
| F | 9 | 35 | 35 | 22 | 2.70 |

It can be seen that fraction D, incorporating 5% glycolic acid surface treated precursor particulates in accordance with the invention, has a markedly lower overall damage grade than the untreated fraction A. By contrast, the use of 10%, i.e. double the level, of glycolic acid as an agglomerating agent results in little decrease in damage grade relative to the untreated material. This confirms the importance of surface treatment of the bleach precursor particulates in obtaining the fabric damage reduction benefit of the invention.

We claim:

1. A granular detergent composition having a bulk density of at least 800 g/liter and comprising:

(a) from about 2 to 6% by weight of the composition of a solid peroxyacid bleach precursor consisting essentially of particles of peroxyacid bleach precursor material or agglomerates, said precursor material having a Mpt >30° C. and being selected from the group consisting of compounds containing at least one N-acyl group and compounds containing at least one O-acyl group, the external surfaces of said bleach precursor material particles or agglomerates being treated with an organic acid compound so as to adhere said organic acid compound to said external surface of said bleach precursor material particles or agglomerates, said organic acid compound being selected from a group consisting of glycolic, 1-lactic and citric acids and mixtures thereof and being present in an amount from about 3% to about 10% by weight of the treated particles or agglomerates thereof, said organic acid compound having an aqueous solubility of at least about 20 g/100 g of water at 20° C. and a Mpt in excess of 50° C., wherein said treated bleach precursor material particles or agglomerates thereof produce, after 3 minutes in a Beaker Perhydrolysis Test at 20° C., at least about 90% of the peroxy acid that is produced under the same conditions by said bleach precursor material particles or agglomerates thereof in untreated form;

(b) from about 8 to 18% by weight of the detergent composition of a granular inorganic perhydrate salt bleach selected from the group consisting of sodium perborate and sodium percarbonate, wherein said granular inorganic perhydrate salt bleach is present as a component separate from said solid peroxyacid bleach precursor; and (c) from about 10 to 15% by weight of the detergent composition of an organic surfactant selected from the group consisting of anionic, non-ionic, cationic, ampholytic surfactants and mixtures thereof, wherein said surfactant is present in said detergent composition as a component separate from said solid peroxyacid bleach precursor and separate from said inorganic perhydrate, said surfactant component comprising particles of which no more than about 5% by weight have a particulate size of less than about 250 micro-meters.

2. A solid peroxyacid bleach precursor composition consisting essentially of particles of peroxyacid bleach precursor material or agglomerates of said particles, said precursor material having a Mpt >30° C. and being selected from the group consisting of compounds containing at least one N-acyl group and compounds containing at least one O-acyl group, the external surfaces of said bleach precursor material particles or agglomerates being treated with an organic acid compound so as to adhere said organic acid compound to said external surfaces of said bleach precursor material particles or agglomerates, said acid compound being present in an amount of from about 2% to about 20% by weight of the treated particles or agglomerates, said organic acid compound having an aqueous solubility of at least about 20 g/100 g of water at 20° C. and a Mpt greater than 30° C., wherein said treated bleach precursor material particles or agglomerates produce, after 3 minutes in a Beaker Perhydrolysis Test at 20° C., at least about 90% of the peroxy acid that is produced under the same conditions by said bleach precursor material particles or agglomerates in untreated form.

3. A solid peroxyacid bleach precursor composition according to claim 2 wherein the precursor is selected from the group consisting of esters and imides.

4. A solid peroxyacid bleach precursor composition according to claim 2 wherein the organic acid compound is selected from the group consisting of monomeric or oligomeric carboxylates.

5. A solid peroxyacid bleach precursor composition according to claim 4 wherein the organic acid compound is a monomeric aliphatic carboxylic acid having a MPt greater than about 40° C.

6. A solid peroxyacid bleach precursor composition according to claim 5 wherein the organic acid compound is selected from the group consisting of glycolic, 1-lactic and citric acids and mixtures thereof.

7. A solid bleach peroxyacid precursor composition according to claim 5 wherein the amount of organic acid compound is from about 2% to about 15% by weight of the composition.

8. A solid peroxyacid bleach precursor composition according to claim 7 wherein the amount of organic acid compound is from about 3% to about 10% by weight of the composition.

9. A solid peroxyacid bleach precursor composition according to claim 8 wherein particulate peroxyacid bleach precursor material is treated with a molten organic acid compound selected from glycolic and 1-lactic acids to provide a coating to the external surfaces of the particulate bleach precursor material.

10. A solid peroxyacid bleach precursor composition according to claim 8 wherein the external surfaces of the particulate peroxyacid bleach precursor material are treated with a solution of dispersion of citric acid.

11. A solid peroxyacid bleach precursor composition according to either one of claims 9 or 10 wherein the organic acid compound is applied as a finely divided spray.

12. A solid peroxyacid bleach precursor composition consisting essentially of particles of peroxyacid bleach precursor material or agglomerates thereof, said precursor having a Mpt >30° C. and being selected from the group consisting of compounds containing at least one N-acyl group and compounds containing at least one O-acyl group, the external surfaces of said bleach precursor material particles or agglomerates being treated with organic acid compound selected from a group consisting of glycolic, 1-lactic and citric acids and mixtures thereof so as to adhere said organic acid compound to said external surfaces of said bleach precursor material particles or agglomerates, said acid compound being present in an amount of from about 2% to about 20% by weight of the treated particles or agglomerates wherein said treated bleach precursor material particles or agglomerates, produce after 3 minutes in a Beaker Perhydrolysis Test at 20° C., substantially the same amount of peroxy acid as is produced under the same conditions by the bleach precursor material particles or agglomerates, in untreated form.

13. A solid peroxyacid bleach precursor composition according to claim 12 wherein the peroxyacid bleach precursor contains at least one N-diacyl moiety.

14. A solid peroxyacid bleach precursor composition according to claim 13 wherein the peroxyacid bleach precursor is a tetraacylated alkylenediamine.

15. A solid peroxyacid bleach precursor composition according to claim 14 wherein the peroxyacid bleach precursor is tetraacetyl ethylenediamine.

16. A solid peroxyacid bleach precursor composition according to claim 15 wherein the particulate precursor material comprises agglomerated particles of the precursor, the agglomerated particles being treated with the organic acid compound.

17. A bleaching composition incorporating a solid peroxyacid bleach precursor composition consisting essentially of:

(a) particles of peroxyacid bleach precursor material or agglomerates thereof, said precursor having a Mpt >30° C. and being selected from a group consisting of compounds containing at least one N-acyl group and compounds containing one O-acyl group, the external surface of said bleach precursor material particles or agglomerates being treated with an organic acid compound so as to adhere said organic acid compound to said external surfaces of said bleach precursor material particles or agglomerates, said acid compound being present in an amount from about 2% to about 20% by weight of the treated particles or agglomerates, said organic acid compound having an aqueous solubility of at least about 20 g/100 g of water at 20° C. and a Mpt greater than about 30° C., wherein said treated bleach precursor material particles or agglomerates produce, after 3 minutes in a Beaker Perhydrolysis Test at 20° C., at least about 90% of the peroxy acid that is produced under the same conditions by said bleach precursor material particles or agglomerates in untreated form; and (b) a granular inorganic perhydrate salt bleach present in said bleaching composition as a component separate from said particles of peroxyacid bleach precursor material or agglomerates.

18. A granular bleaching composition according to claim 17 wherein the perhydrate bleach is selected from the group consisting of sodium perborate and sodium percarbonate, and said perhydrate bleach is present as a dry-added granular material.

* * * * *